United States Patent [19]

Cerf

[11] Patent Number: 4,909,412
[45] Date of Patent: Mar. 20, 1990

[54] MACHINES AND METHODS FOR SEPARATING NESTED TRAYS

[75] Inventor: Alain A. Cerf, Largo, Fla.

[73] Assignee: Polycerf Inc., Fla.

[21] Appl. No.: 252,835

[22] Filed: Sep. 30, 1988

[51] Int. Cl.[4] .............................................. B65H 3/28
[52] U.S. Cl. ..................... 221/1; 221/221; 221/223; 221/297; 414/795.6; 414/798; 414/798.1; 414/797.7
[58] Field of Search ................. 414/795.6, 798, 798.1, 414/797.7; 221/221, 223, 297, 1

[56] References Cited

U.S. PATENT DOCUMENTS

| | | | |
|---|---|---|---|
| 3,165,233 | 1/1965 | West .................................. | 221/221 |
| 3,283,952 | 11/1966 | Burt .................................. | 221/221 X |
| 3,297,201 | 1/1967 | Burt .................................. | 221/221 |
| 3,403,816 | 10/1968 | Verrinder et al. ............ | 414/795.6 X |
| 3,477,592 | 11/1969 | Kuhlman ......................... | 414/795.6 |
| 3,659,744 | 5/1972 | Byrd et al. ...................... | 221/221 X |
| 3,661,278 | 5/1972 | Hammerle ....................... | 414/798.1 |
| 3,664,521 | 5/1972 | Feher ................................ | 414/795.6 |
| 3,701,440 | 10/1972 | Windstrup et al. ............. | 414/795.6 |
| 4,439,101 | 3/1984 | Orlowsk et al. ................. | 414/795.6 |
| 4,809,881 | 3/1989 | Becker ............................. | 414/795.6 X |

FOREIGN PATENT DOCUMENTS

| | | | |
|---|---|---|---|
| 1224657 | 11/1960 | Fed. Rep. of Germany ...... | 221/221 |
| 1916782 | 10/1970 | Fed. Rep. of Germany ...... | 414/798 |
| 2246944 | 4/1974 | Fed. Rep. of Germany ... | 221/297.7 |
| 0100025 | 6/1983 | Japan ................................ | 414/797.7 |

*Primary Examiner*—F. J. Bartuska
*Assistant Examiner*—Boris Milef
*Attorney, Agent, or Firm*—Ronald E. Smith; Joseph C. Mason

[57] ABSTRACT

A machine and method for separation of nested articles such as trays. Nested articles of the type that do not separate from one another under the influence of gravity alone are stacked in vertical nesting relation to one another. Plural blade members are movably mounted about the periphery of the tray members. In a first embodiment, the blade members move horizontally and vertically in a novel sequence to dislodge one tray from the lowermost end of the stack during each cycle of the operation. In a second embodiment, the blade members are pivotally mounted.

11 Claims, 9 Drawing Sheets

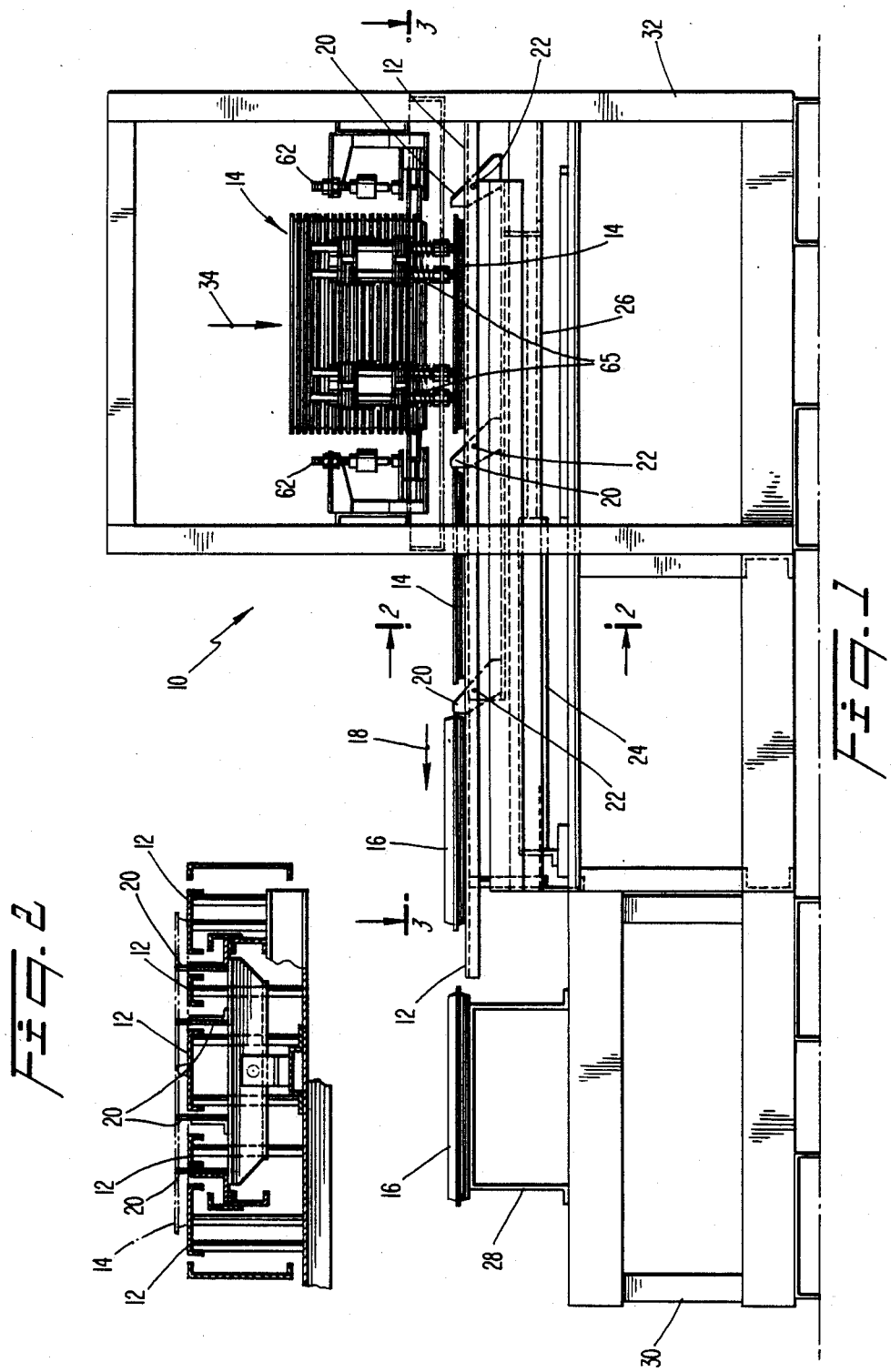

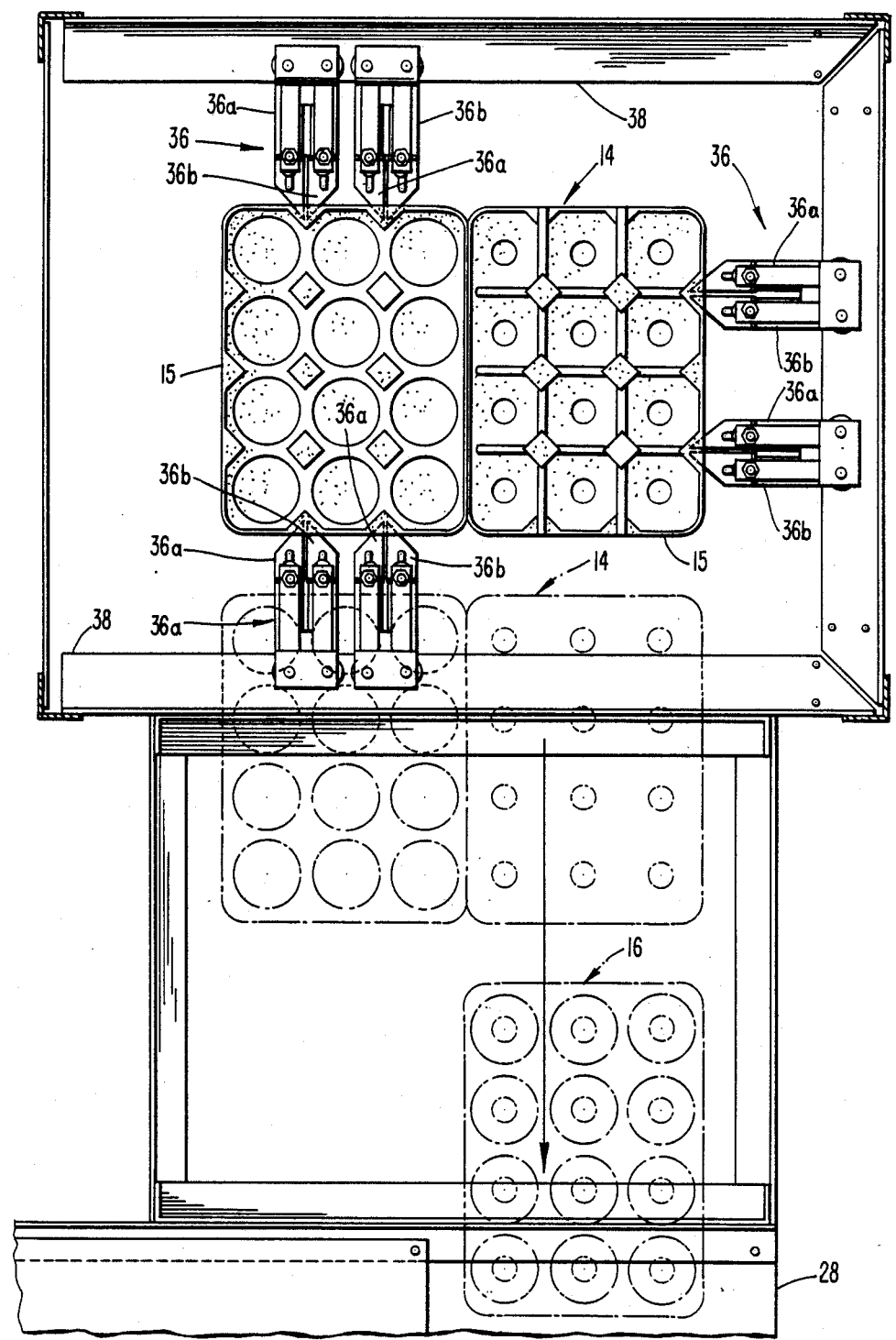

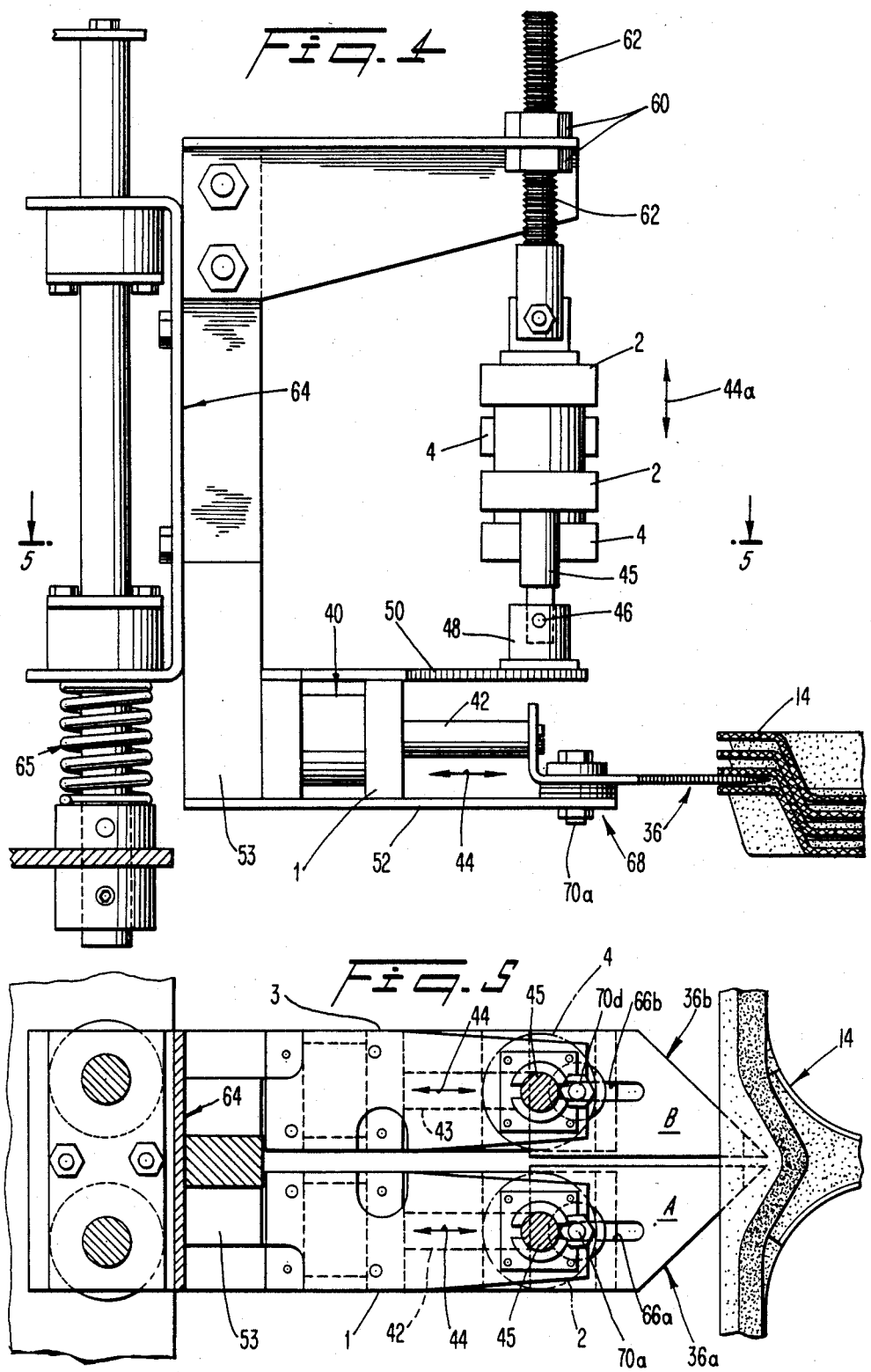

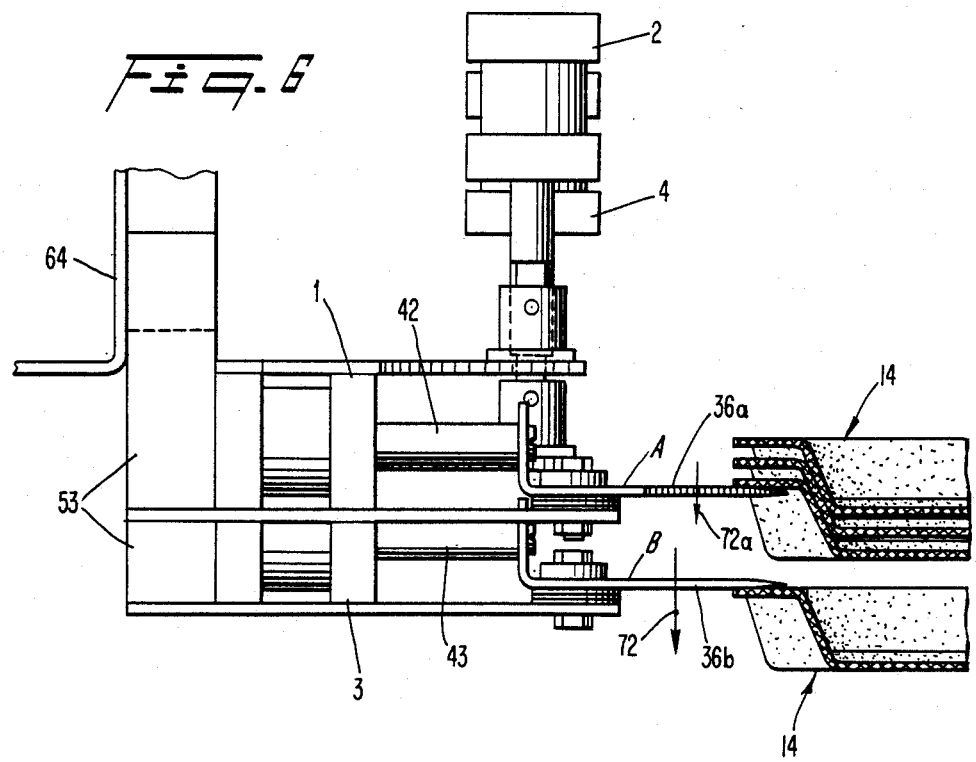
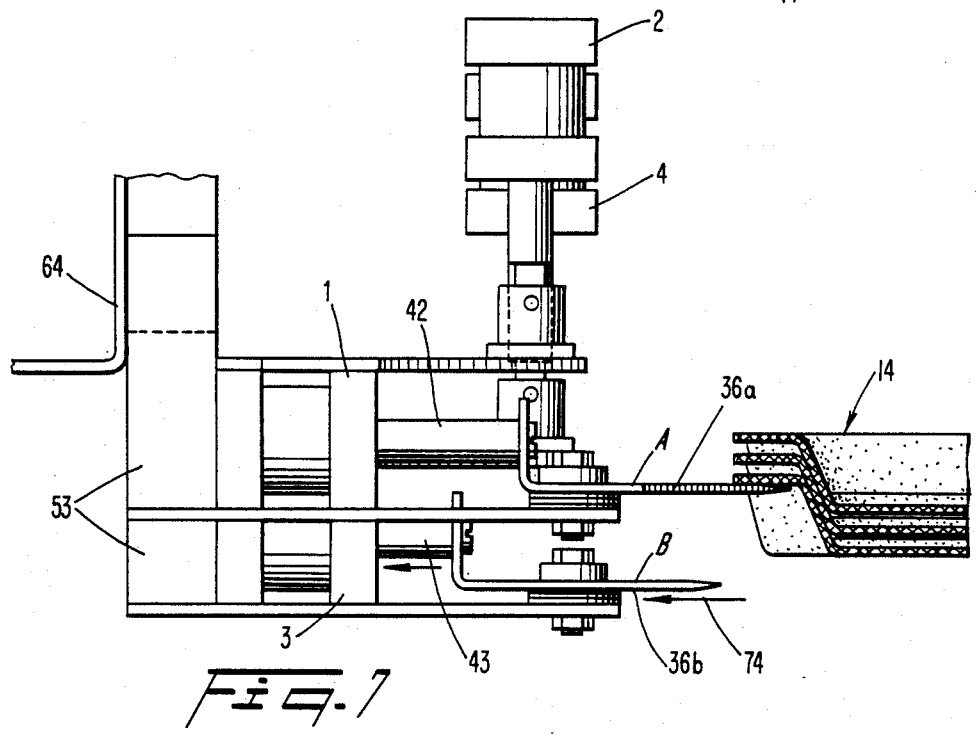

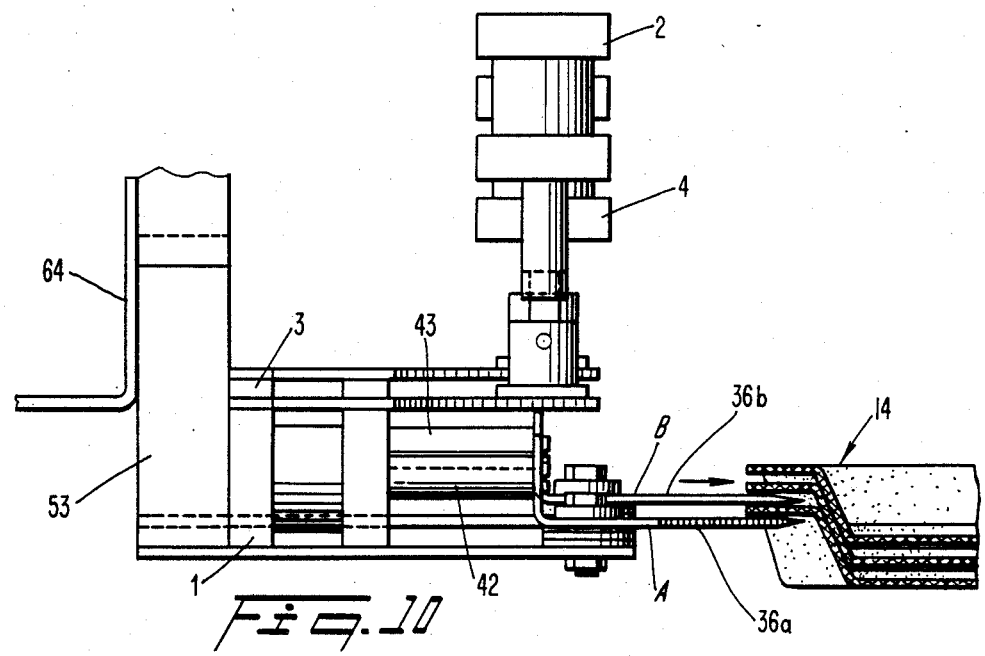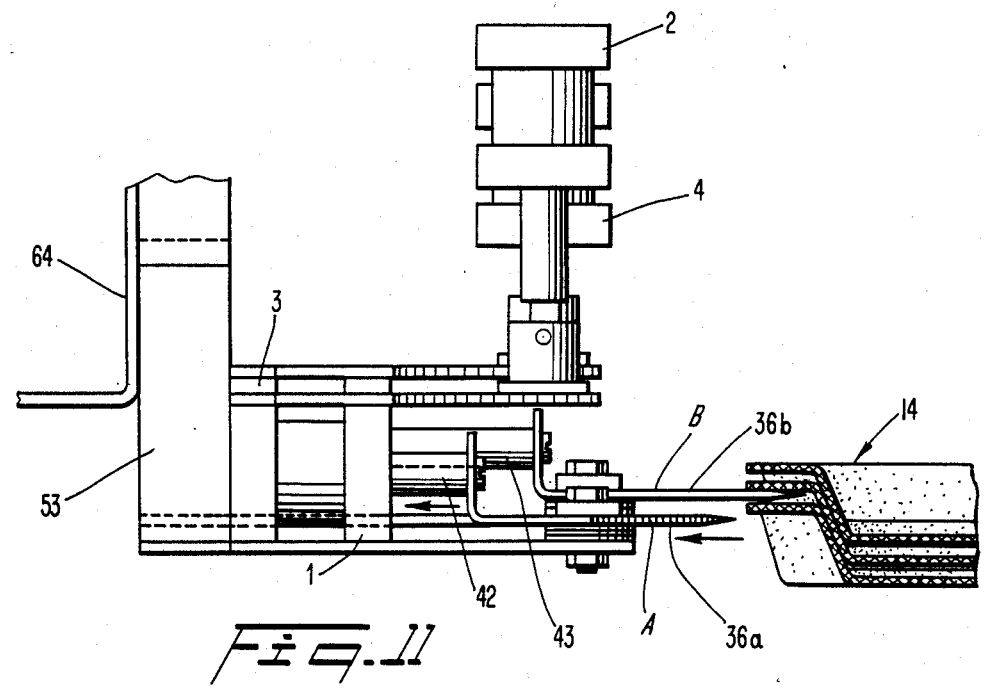

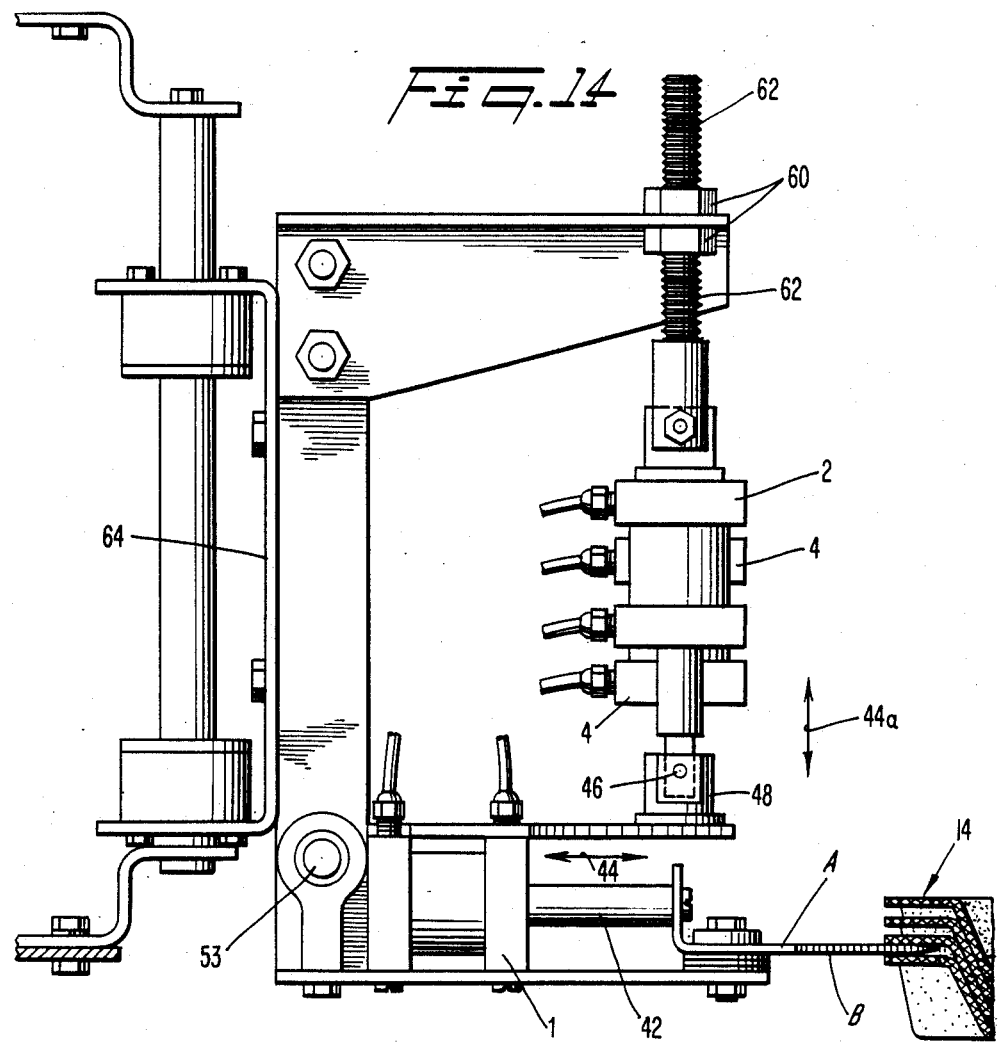
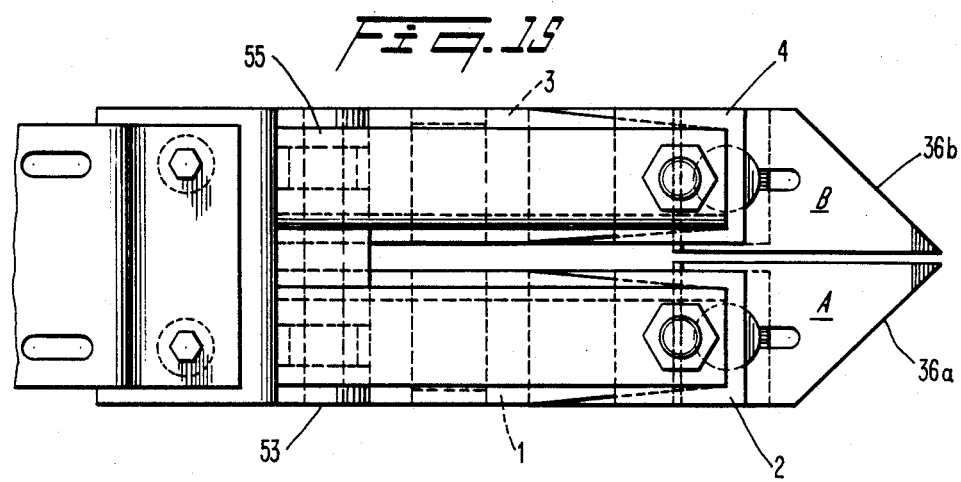

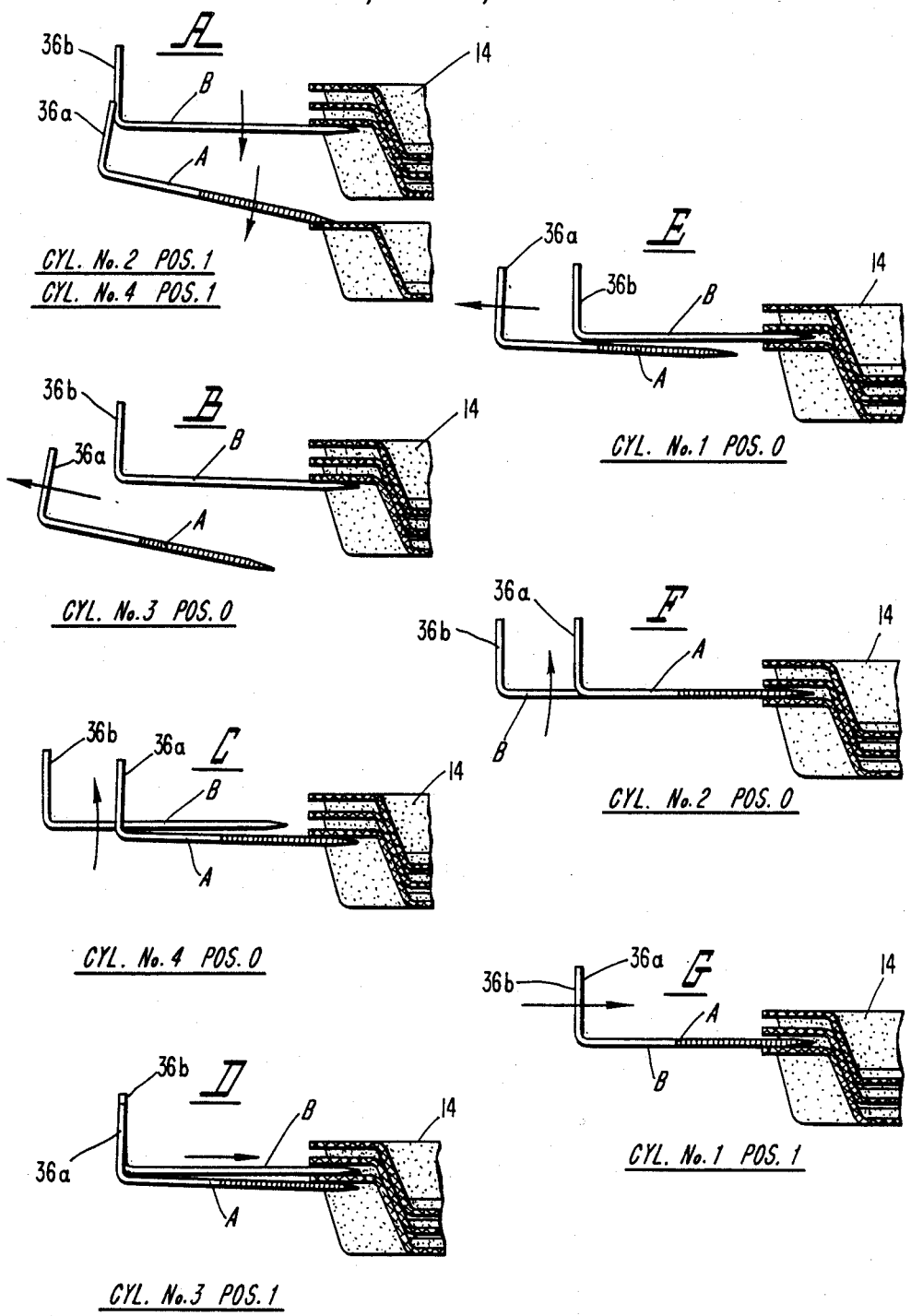

MACHINES AND METHODS FOR SEPARATING NESTED TRAYS

TECHNICAL FIELD

This invention relates, generally, to the machine arts and more specifically relates to a machine having utility in separating frictionally-engaged nested articles such as trays from one another.

BACKGROUND ART

It has long been known that a plurality of trays and similar articles will occupy a minimum amount of space if the articles are complementally designed to allow them to be stacked in nesting relationship to one another.

However, if the articles are snugly nested, some means is needed to separate them, one at a time, when it is desired to load individual trays.

For example, when a stack of nested trays is delivered to a machine that loads items onto individual trays, the trays must be separated from the stack one at a time and delivered to the machine.

This task is conventionally accomplished manually, i.e., an individual posted at the input end of the tray-loading machine separates the trays and deposits them onto a conveyor belt that leads to the first active stage of the machine. The machine then loads predetermined articles into the trays for subsequent packaging and shipping.

Such manual tray unstacking is an economically inefficient way of performing the needed function, but heretofore there have been no teachings or suggestions as to how the unnesting procedure could be accomplished in any other way.

DISCLOSURE OF INVENTION

Vertically stacked and nested trays or similar articles are supported by a plurality of support members positioned about the periphery of the second lowermost article in the stack; the lowermost article is suspended by its frictional engagement with said second lowermost article. The novel tray separating machine removes the lowermost tray from the bottom of the stack on a continuous basis; thus, a human operator or other suitable delivery means merely needs to periodically add additional quantities of nested articles to the top of the stack. The inventive tray de-nesting machine is otherwise entirely automatic; the weight of the stacked articles maintains the lowermost and second lowermost articles in their proper relation to the support members, i.e., the tray-separating means is gravity fed.

Each support member has two primary parts; the parts, hereinafter referred to as blade members, are planar in configuration and although they are quite thin, are nonetheless substantially inflexible so that they are not bent by the weight of the articles they support. They are movable independently of each other and their outermost or free ends perform the tray-supporting and separating functions.

In a first embodiment, the blade members move inwardly and outwardly in a horizontal plane and upwardly and downwardly in a vertical plane.

In a second embodiment, the blade members are pivotally mounted so that their free ends travel upwardly and downwardly in an arc, and inwardly and outwardly in horizontal and angled planes.

The blade members of each support member are laterally disposed and closely spaced with respect to one another, but they are disposed in a common horizontal plane only transiently as the machine operates.

There are, essentially, seven steps in the cycle that performs the separation operation.

In both the pivotal and non-pivotal embodiments of the invention, the tray separation cycle begins with both blade members lying in a common horizontal plane in their fully extended position; the free ends of each blade member underlie a flange portion of the penultimate tray in the stack, thereby supporting the weight of all the trays in the stack other than the lowermost tray which lowermost tray is suspended in vertically spaced relation to a conveyor means by its frictional engagement with the penultimate tray.

In the non-pivotal embodiment, one of the two blade members in each pair of support members disposed about the periphery of the stack of trays travels straight downwardly, separating the lowermost tray in the stack from its frictional engagement with the penultimate tray and causing the separated tray to fall under the influence of gravity to the conveyor means which carries it away, while the stack supporting blade member indexes downwardly to present a new lowermost tray into position.

In the second step, the tray de-nesting blade retracts; in step three, it travels, still retracted, upwardly until it is disposed above the plane of the stack-supporting blade member; it is spaced upwardly of said stack-supporting blade member by a distance just slightly greater than the thickness of a tray flange.

The de-nesting blade then extends forwardly until it underlies the flange of what is now the penultimate tray in the stack. The heretofore stack-supporting blade then retracts, for step five, travels upwardly to the plane of the other blade for step six and extends for step seven which is the above-described initial position.

In the pivotal embodiment, which operates essentially in the same way as the first embodiment, both blades pivot downwardly for the first step; one of the blades sweeps out a larger downward arc, separating the lowermost tray so that it falls onto the conveyor means while the other blade sweeps a small arc only slightly greater than the thickness of a tray flange to index the stack of trays downwardly as required.

The tray-separating blade retracts in step two, just as in the non-pivotal embodiment, but the retraction occurs while the blade is angled downwardly. The retracted blade then pivots upwardly until it lies in a horizontal plane at the completion of step three. In step four, it extends in a horizontal plane to underlie the flange of the new penultimate tray in the stack. In step five, the non-tray supporting blade retracts; it pivots upwardly into a horizontal plane in step six and extends so that it is co-extensive with the tray-supporting blade at the completion of the seventh step.

The primary object of this invention is to pioneer the art of mechanical separation of snugly nested articles.

A more specific object is to disclose a method for nested article separation and machines for carrying out the steps of the method.

The invention accordingly comprises the features of construction, combination of elements and arrangement of parts that will be exemplified in the descriptions set forth hereinafter and the scope of the invention will be set forth in the claims.

BRIEF DESCRIPTION OF DRAWINGS

For a fuller understanding of the nature and objects of the invention, reference should be made to the following detailed description, taken in connection with the accompanying drawings, in which:

FIG. 1 is a side elevational view of a machine that separates nested trays from a stack and delivers them, one at a time, to an unloading station;

FIG. 2 is a transverse sectional view taken along line 2-2 in FIG. 1;

FIG. 3 is a plan view taken along line 3—3 in FIG. 1, showing a suggested position of the novel blade members of this invention in connection with a certain type of tray;

FIG. 4 is a side elevational view of a first embodiment showing the mechanical mounting of the blade members in their initial position and showing the blade members in their extended position;

FIG. 5 is a sectional view taken along line 5—5 in FIG. 4;

FIG. 6 is a side elevational view showing the first step of the inventive cycle of operations for the first embodiment;

FIG. 7 is a side elevational view showing the second step in the novel cycle of operations;

FIG. 10 is a side elevational view showing the fourth step in the novel cycle of operations;

FIG. 11 is a side elevational view showing the fifth step in the novel cycle of operations;

FIG. 14 is a side elevational view similar to that of FIG. 4, but showing the pivotal mechanism employed in a second embodiment of the inventive mechanism;

FIG. 15 is a plan view similar to that of FIG. 2, but showing the pivotal mechanism of FIG. 14; and FIG. 16A-G are a diagrammatic animation of the positions assumed by the pivotally mounted blade members as the steps of the novel method are carried out.

Similar reference numerals refer to similar parts throughout the several views of the drawings.

BEST MODES FOR CARRYING OUT THE INVENTION

Figure 8:
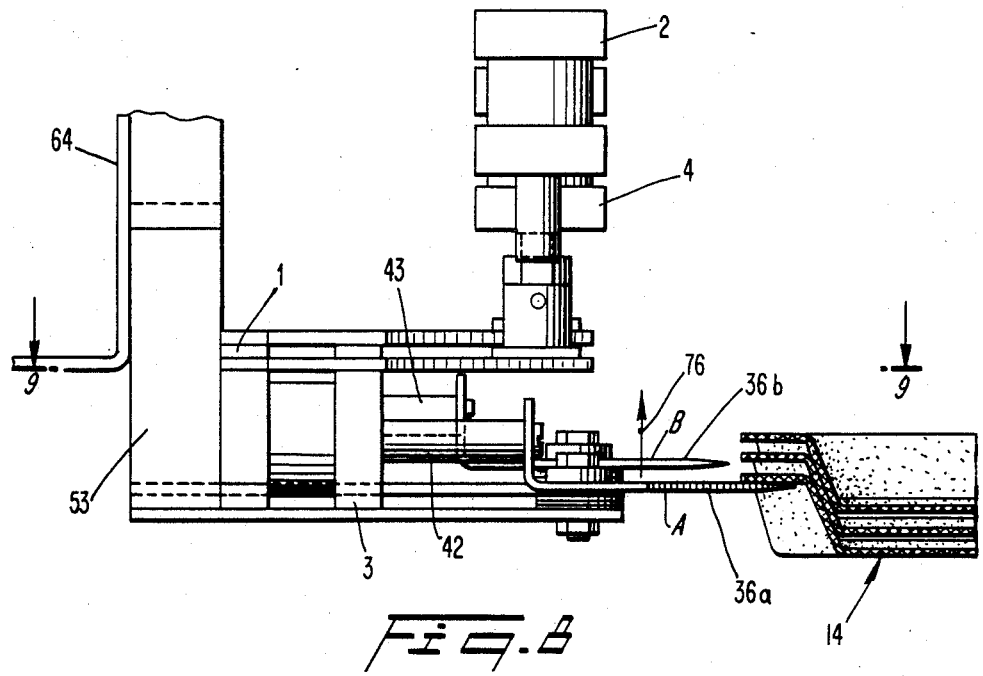
FIG. 8 is a side elevational view showing the third step in the novel cycle of operations.

Referring now to FIG. 1, it will there be seen that a machine capable of carrying out the steps of the inventive methods is designated as a whole by the reference numeral 10. Machine 10 includes a longitudinally extending flat tray support means that is formed by a plurality of transversely spaced apart coplanar support members that are collectively denoted 12 in FIG. 2.

Unfolded tray members are denoted 14 in FIG. 1 and are denoted 16 when in their folded or ready-to-use configuration. The means for folding or closing the tray members form no part, per se, of this invention. FIG. 3 best explains what is meant by "unfolded" and "folded." An unfolded tray 14 that has been separated from a stack of nested unfolded trays appears in the middle of the drawing, a folded tray 16 appears at the bottom of the drawing, and a stack of nested unfolded trays is shown at the top of the drawing, supported by the novel support members.

As best understood in connection with FIG. 1, the trays are propelled along support surface 12, after they have been de-nested, in the direction of directional arrow 18 by push members 20 that are pivotally mounted as at 22 so that their uppermost ends extend upwardly of the plane of support means 12 as shown in FIGS. 1 and 2.

A longitudinally extending, elongate air cylinder having stationary cylindrical housing member 24 and telescoping plunger member 26 is operative to effect axial reciprocation of push members 20; retraction of telescoping member 26 into housing 24 effects travel of push members 20 in the direction of arrow 18 whereas extension of telescoping member 26 effects reverse direction travel of push members 20. Due to their pivotal mounting, push members 20 pivot about pivot point 22 and do not extend above the plane of tray support surface 12 during their reverse travel.

As shown in FIG. 1, a separated or de-nested and folded tray 16 is resting atop discharge station 28, having been propelled thereto by the left-most push member 20 at the completion of its forward stroke (right to left as illustrated). Thus, it should be understood that FIG. 1 depicts machine 10 when telescoping plunger member 26 is fully extended; the unfolded tray 14 at the right side of the drawing, resting atop support means 12, has just been separated by the novel de-nesting means of this invention from the bottom of a stack of trays 14 immediately above it.

Reference numeral 30 generally denotes the frame of the unloading station whereas 32 generally denotes the frame of the tray de-nesting portion of the machine.

Downwardly pointing directional arrow 34 in FIG. 1 indicates that the height of the stack of trays diminishes as the machine operates; a suitable electric eye means generates a signal when the stack requires replenishing, i.e., when the height of the stack falls beneath a predetermined level.

FIG. 3 depicts six pairs of blade members, collectively denoted 36; the depicted positioning thereof about the periphery of an unfolded tray 14 has been found useful in connection with the type of tray 14 shown, although it is important to appreciate the obvious fact that differing amounts of blade member pairs 36 and differing positions thereof may be employed for differing types of trays.

Each blade member of each pair 36 of blade members is formed independently of its adjacent blade member and its movement is independently controlled by pneumatic means as will become more clear as this description proceeds.

FIG. 3 shows all 12 blade members in their extended position, i.e., the distal free end of each blade member 36a, 36b, is extending inwardly of the outermost peripheral boundary 15 of tray 14. The respective proximal ends of the blade members 36 are mounted to mounting means collectively designated 38. The blade positions of the first inventive embodiment and their mounting means are better understood, however, in connection with FIGS. 4-13.

A nested stack of only four trays 14 appears in cut off, side elevational view in FIG. 4 to simplify the drawing; a single pair 36 of blade members 36a, 36b is shown in FIG. 4 in coplanar alignment with one another and in their common extended position, although it is important to recall that plural pairs of blade members are positioned about the periphery of the stack of trays 14 as aforesaid.

Four pneumatically-controlled air cylinders 1–4 are depicted in FIGS. 4 and 5; air cylinder 1 includes housing 40 which telescopically receives plunger member 42 for reciprocal oscillation of blade member 36a in a horizontal plane as suggested by the double-headed directional arrow 44. Cylinder 3 and plunger member 43 (FIG. 5) likewise effect horizontal oscillation of blade member 36b. Cylinder 2 includes plunger member 45 (FIG. 4) which is secured as at 46 to a truncate sleeve member 48 that in turn is fixedly secured to horizontal top plate 50. Horizontal bottom plate 52 is fixedly secured by suitable means 53 to top plate 50 and both plates thus reciprocate in a vertical plane as indicated by arrow 44a under the control of air cylinder 2 when the novel machine is operating thereby effecting vertical oscillation of blade member 36a. Cylinder 4 and similar associated parts effects vertical oscillation of blade member 36b.

The position of the vertical reciprocation means is adjustable in a well known manner, i.e., nuts 60 are adjustable along the extent of threads 62.

As shown at the left side of FIG. 4, the vertical and horizontal control means are carried by a frame means denoted 64 as a whole. Spring 65 dampens vibrations that may appear as the air cylinders operate.

Blade members 36a, 36b are shown in more detail in FIG. 5 and will hereinafter be referred to as blade A and blade B, respectively. It will there be seen that each blade member is slotted as at 66a, 66b. The slot permits travel of the blade member in a horizontal plane; more specifically, the mounting assembly denoted 68 as a whole at the bottom of FIG. 4 includes a rod member 70a that extends through its associated slot to provide a guide means when blade A reciprocates in a horizontal plane. A similar guide means 70b (FIG. 5) facilitates horizontal oscillation of blade B. Of course, the particular nuts, bolts, washers, screws and other illustrated mechanical components are not critical to this invention and entirely different mechanical fastening means could be employed to carry out the inventive tray-separating method as those skilled in the art of machine design will appreciate.

Blades A and B are shown in their fully extended positions in FIGS. 4 and 5; specifically, each blade is shown disposed in overlying relation to the flange of the lowermost tray in the stack of trays and in underlying relation to the flange of the penultimate tray.

Having provided an overview of the illustrated embodiment of a machine capable of performing the inventive steps, the sequential steps depicted in FIGS. 6–13 can now be described without making further reference to the specific mechanical connections and pneumatic operations involved.

Figure 13:
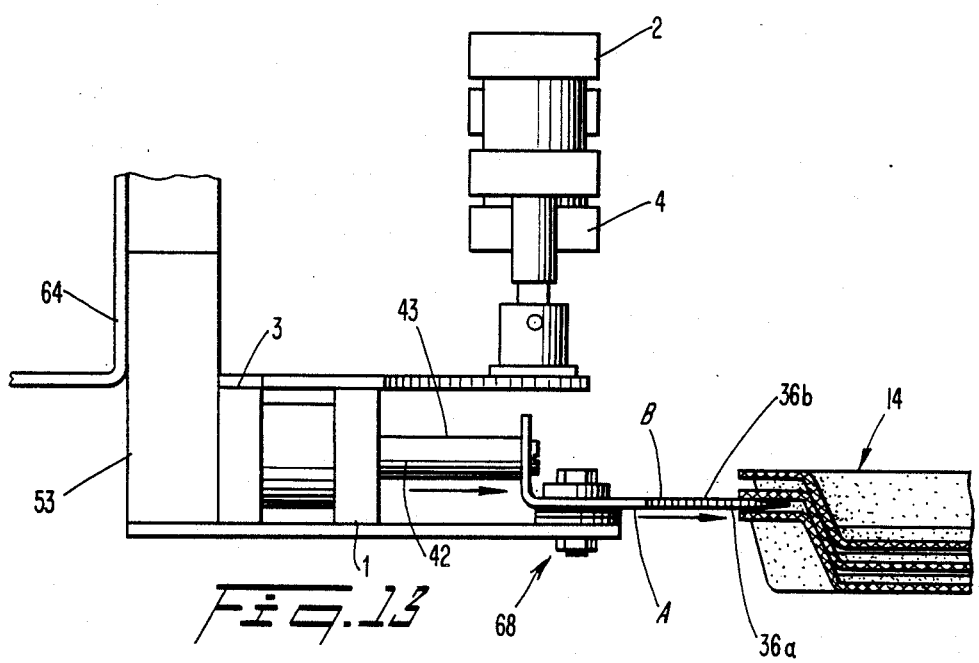
FIG. 13 is a side elevational view showing the seventh step (or initial position) in the novel cycle of operations.

FIG. 13, for convenience, will be termed a depiction of the initial (or final) position of blades A and B; however, since the operation to be described is entirely cyclic, any step thereof could just as arbitrarily be referred to as the initial or final step of the cycle.

Blade A is displaced downwardly as at 72a from its FIG. 13 position a short distance just greater than the thickness of a flange while simultaneously blade B moves downwardly a much greater distance as shown in FIG. 6 and as indicated by the downwardly pointing directional arrow 72 in FIG. 6; the downward motion overcomes the frictional engagement between the nested trays and the lowermost tray 14 is dislodged as depicted so that it falls to the aforesaid tray support surface 12 directly below. The penultimate tray in FIGS. 4 and 6 now becomes the lowermost tray and is supported at its flanges by blade A as shown in FIG. 6.

In step two, blade B retracts as shown in FIG. 7 and as denoted by reference numeral 74 while blade A remains in its slightly lowered position.

Figure 9:
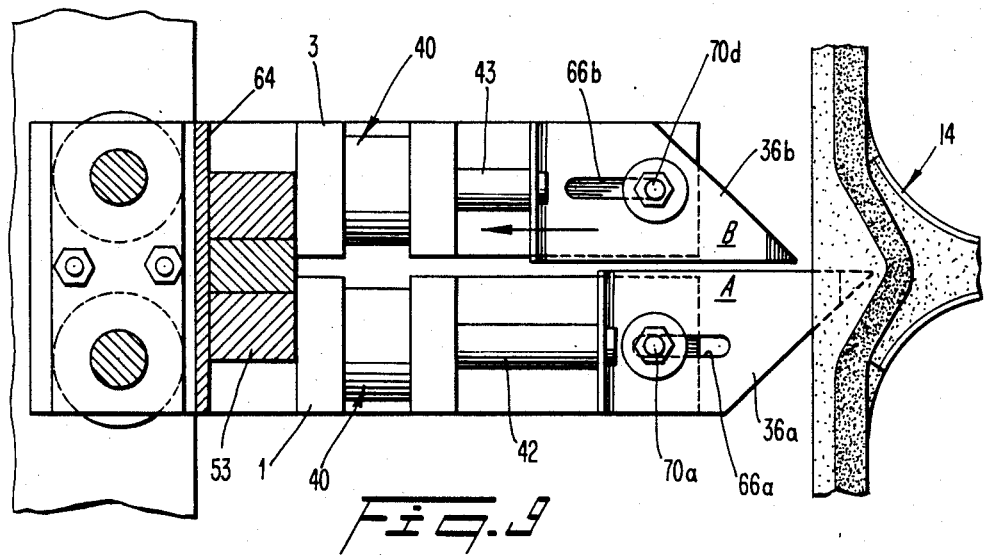
FIG. 9 is a plan view taken along line 9—9 in FIG. 8.

At the completion of step three, shown in FIG. 8, retracted blade B has moved upwardly as shown and as indicated by directional arrow 76. The length of its upward stroke is equal to the length of its downward stroke since the entire stack of trays will have dropped downwardly when blade A dropped. FIG. 9 depicts in plan view the blade position of FIG. 8.

In FIG. 10, extended blade A is underlying the flange of the lowermost tray in the nested stack as in FIGS. 6–9; blade B has extended from its FIG. 9 position and is disposed in overlying relation to said lowermost flange and in underlying relation to the flange of the penultimate tray in the stack.

FIG. 11 depicts the respective positions of blade members A, B at the completion of the fifth step. Blade A has retracted and blade B has not moved from its FIG. 10 position; thus, the lowermost tray is suspended above tray support surface 12 (FIGS. 1 and 2) by its frictional engagement with the penultimate tray. The tight fit and consequent frictional engagement between the nested trays is apparent from FIG. 11.

Figure 12:
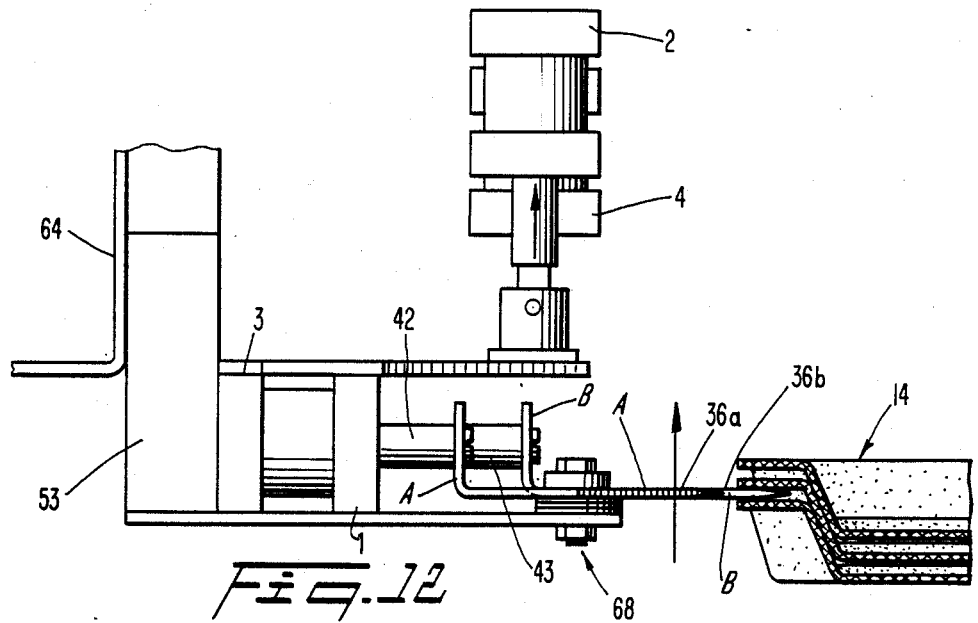
FIG. 12 is a side elevational view showing the sixth step in the novel cycle of operations.

Blade B again remains unmoved from its FIG. 10 position at the completion of the sixth step, as depicted in FIG. 12. Retracted blade A has moved upwardly, as indicated by directional arrow 70, into coplanar relation to blade B.

At the completion of the seventh step, blade B is again extended and the "initial" position of FIG. 13 is achieved; the cycle of operation beginning at FIG. 6 then repeats.

The logic circuitry and pneumatic control system that controls the above-described operation of the machine form no part of the invention, per se; those skilled in the electrical, electronic and pneumatic arts will know how to make and use the novel machine in view of this disclosure.

Those skilled in the art of machine design will realize that numerous variations of the disclosed machine could be made; all of such varied embodiments are within the clear scope of this invention.

Indeed, it is the steps carried out by the machine that form the heart of the invention, i.e., the inventive method is protected by these Letters Patent, regardless of the form or structure of the machine that performs the inventive steps.

More particularly, the inventive steps of the first embodiment include positioning at least one pair of blade members adjacent to a stack of nested tray members. Initially, both blades overlie the flange of the lowermost tray and underlie the flange of the second lowermost tray so that both blade members support the weight of the stack and so that the lowermost tray is suspended over a conveyor means.

The tray de-nesting blade then makes a long downward stroke to dislodge the lowermost tray from the stack so that it falls under the influence of gravity to the support surface disposed beneath the stack of trays while the stack-supporting blade makes a short downward stroke, indexing downwardly to position the new lowermost tray into the position vacated by the de-nested tray.

The de-nesting blade member then retracts and makes a long upward stroke until it is above the plane of the other blade, i.e., until it is positioned in a plane above the flange of the now lowermost tray and just below the plane of the flange of the now penultimate tray. The de-nesting blade is then extended and the remaining blade retracts, travels upwardly to the plane of the de-nesting blade, and extends so that both blades are extended and in coplanar relation to one another, so that the steps of the cycle can repeat.

A second preferred embodiment of the novel de-nesting mechanism capable of carrying out the steps of the inventive method is depicted in FIGS. 14–16. It will be noted that FIG. 14 differs from FIG. 4 in that spring 65 is not needed in this embodiment. More importantly, whereas the blade members of the first described embodiment were non-pivotally mounted for reciprocal movement in horizontal and vertical planes, they are pivotally mounted in the embodiment of FIGS. 14–16. More specifically, blade B is pivoted about pivot point 55 and blade A is pivoted about pivot point 53 as perhaps best understood in connection with FIG. 15.

The air cylinders of this embodiment are again numbered 1–4 as shown in FIGS. 14 and 15; cylinders 2 and 4 effect pivotal rotation of blade members A and B about pivot points 53 and 55, respectively, and cylinders 1 and 3 effect retraction and extension of blade members A and B, respectively.

Each cylinder has two positions, denoted 0 and 1 in FIG. 16.

For the cylinders which effect pivotal motion, cylinders 2 and 4, the "up" position thereof is designated by the numeral "0" in FIG. 16 whereas the "down" position thereof is denoted "1".

For cylinders 1 and 3, which effect retraction and extension, the retracted positions thereof are denoted "0" and the extended positions thereof are denoted "1".

Thus, the inventive cycle begins as shown in FIG. 16A; cylinders 2 and 4 go to their respective downwardmost positions. It should be understood that FIG. 16G depicts the initial (or final) position.

Cylinder 3 then goes to its retracted position as indicated in FIG. 16B so that blade B retracts as indicated by the directional arrow n FIG. 16B.

Cylinder 4 then goes to its "0" position, thereby pivoting retracted blade B into a horizontal plane as shown in FIG. 16C.

Blade B then extends as cylinder 3 goes to its first position as indicated in FIG. 16D.

Cylinder 1 then goes to its retracted position, position "0", thereby retracting blade member A as indicated in FIG. 16E.

Next, cylinder 2 goes to its "0" position, thereby pivoting blade A into its horizontal position as depicted in FIG. 16F.

Finally, cylinder 1 goes to its first position, thereby driving blade A into its extended position as depicted in FIG. 16G.

Thus, the position of FIG. 16G may be thought of as the initial position of the inventive cycle.

Those skilled in the art of machine design will recognize this invention as a breakthrough invention in the field of nested tray separation. In view of the pioneering nature of this invention, the claims which follow are entitled to broad interpretation so as to protect the heart of this invention, as a matter of law.

INDUSTRIAL APPLICABILITY

Nested trays held together by frictional engagement are ubiquitous in industry. The novel machines and methods disclosed herein will thus have a broad impact on a very large industrial segment of the worldwide economy. Even unnested articles such as plates, papers and other stacked materials may be separated by following the novel methods disclosed herein.

It will thus be seen that the objects set forth above, and those made apparent from the foregoing description, are efficiently attained and since certain changes may be made in the above construction without departing from the scope of the invention, it is intended that all matters contained in the foregoing description or shown in the accompanying drawings shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

Now that the invention has been described,
What is claimed is:

1. A machine that separates nested articles, of the type having peripheral flanges, from one another, comprising:
    at least a pair of support members disposed adjacent a stack of nested articles;
    each of said pairs of support members having a first support member and a second support member;
    each of said support members having a retracted position away from said peripheral flanges;
    each of said support members being mounted for movement in a vertical plane;
    each of said support members having an extended position where a distal end thereof may overlie or underlie a flange, depending on said support member's vertical position;
    a first support member of each pair of support members being vertically movable over a distance only slightly greater than a flange thickness;
    said second support member having a long, downwardly directed vertical movement when extended, for separating a flanged article from a bottom of a stack of flanged articles;
    said second support member having a long, upwardly directed vertical movement when retracted, said upwardly directed movement being equal to its downwardly directed vertical movement; and
    at least one support member of each of said pairs of support members being in its extended position at all times to support said stack of nested articles when another of said support members is in a retracted position.

2. The machine of claim 1, wherein each of said support members is a generally flat blade member having a thickness less than a vertical distance between contiguous flanges of said nested articles.

3. The machine of claim 2, further comprising an article support surface disposed in vertically spaced relation downwardly of said stack of nested articles so that when a nested article on the bottom of said stack is dislodged therefrom, said nested article falls under the influence of gravity to said article support surface.

4. The machine of claim 3, further comprising an article discharge station and a conveyor means for transporting separated articles to said article discharge station.

5. A method for separating snugly nested articles from one another, comprising the steps of:

supporting a vertical stack of flanged, nested articles by arranging plural pairs of independently mounted and independently movable first and second support members about the periphery thereof and positioning both members of each pair of said support members in underlying relation to the flange of the second lowermost article in the stack, at spaced locations thereabout;

dislodging the lowermost article in the stack by moving a first member of each pair of support members downwardly a predetermined distance;

simultaneously moving a second member of each pair of support members in a downward direction by an amount only slightly greater than a flange thickness;

retracting said first support member away from said stack of articles and thereafter upwardly until it is spaced above the plane of said second support member by a distance slightly greater than the thickness of a flange;

extending said first support member until it overlies a flange of the lowermost article in the stack;

retracting said second support member, raising it to the plane of said first support member and extending said second support member until it also overlies a flange of the lowermost article in the stack; and repeating the preceding steps.

6. A method of separating from one another the trays of a nested vertical stack of trays, comprising the steps of:

supporting the weight of the stack by plural pairs of flat blade members disposed about the periphery of the second lowermost tray in the stack;

removing the lowermost tray of the stack by displacing it downwardly with a first member of each pair of blade members;

simultaneously lowering the stack of trays by lowering a second blade member of each pair of blade members a short distance sufficient to position a penultimate tray in the stack prior to said removal at the prior position of the removed tray;

moving said first blade member into overlying relation to a flange of a new lowermost tray;

moving said second blade member into overlying relation to said flange of said new lowermost tray; and repeating the preceding steps.

7. A machine that separates stacked articles from one another by displacing the lowermost article from the stack while holding the articles stacked thereabove against falling, comprising:

a plurality of article support members disposed about the periphery of said stack;

each of said support members being a first and second blade member;

said machine having an initial position where each of said blade members is disposed in lateral, coplanar relationship to one another;

each of said blade members being mounted for pivotal movement independently of each other, at a proximal end thereof;

each of said blade members having means for retracting and extending said blade members independently of said pivotal movement;

each of said blade members having a distal free end that overlies or underlies a flange portion of an article when in its extended position; and means for sequentially activating said blade members to separate the stacked articles from one another.

8. The machine of claim 7, wherein a first blade member has a downwardly pivoting stroke and an upwardly pivoting stroke that transverses an arc only slightly greater than a flange thickness.

9. The machine of claim 8, wherein a second blade member has a downwardly pivoting stroke when extended that separates an article from a lowermost position of said stack of articles, said downwardly pivoting stroke being substantially greater in length than the downwardly pivoting stroke of said first blade member.

10. The machine of claim 9, wherein said second blade member has an upwardly pivoting stroke, said upwardly pivoting stroke being equal in length to said downwardly extending stroke.

11. A method of separating the lowermost article from a vertically arrayed stack of articles, comprising the steps of:

positioning a plurality of pivotally mounted, flat blade members about the periphery of said stack of articles;

grouping said blade members into pairs;

independently mounting each blade member so that it may retract and extend with respect to said stack of articles;

providing means for causing said blade members to pivot, extend and retract in a predetermined sequence to sequentially remove the lowermost article from the stack;

positioning both blade members of each pair in a common horizontal plane so that their respective free ends overlie a flange of a lowermost article in a stack and underlie a flange of a penultimate article in a stack;

pivoting a first blade member of each pair downwardly so that it sweeps out a long arc and causes said lowermost article to separate from the stack and to fall under the influence of gravity;

simultaneously pivoting downwardly a second blade member of each pair so that it sweeps an arc only slightly greater than a flange thickness;

retracting said first blade member;

pivoting said first blade member upwardly until it lies in a horizontal plane;

extending said first blade member until it overlies a flange of a new lowermost article in said stack;

retracting said second blade member;

pivoting said second blade member upwardly into a horizontal plane;

extending said second blade member so that it overlies a flange of a lowermost article in said stack; and repeating the foregoing steps.

* * * * *